United States Patent [19]

Garrett et al.

[11] 4,153,514
[45] May 8, 1979

[54] PYROLYSIS PROCESS FOR SOLID WASTES

[75] Inventors: Donald E. Garrett, Claremont; George M. Mallan, Pomona, both of Calif.

[73] Assignee: Occidental Petroleum Corporation, Los Angeles, Calif.

[21] Appl. No.: 687,150

[22] Filed: May 17, 1976

Related U.S. Application Data

[63] Continuation of Ser. No. 553,772, Feb. 27, 1975, abandoned, which is a continuation of Ser. No. 354,247, Apr. 25, 1973, abandoned, which is a continuation-in-part of Ser. No. 251,074, May 8, 1972, abandoned, which is a continuation-in-part of Ser. No. 61,669, Aug. 6, 1970, abandoned.

[51] Int. Cl.² ...................... C10B 49/20; C10B 53/02
[52] U.S. Cl. .......................................... 201/2.5; 201/8; 201/12; 201/22; 201/25
[58] Field of Search ...................... 201/2.5, 12, 14–16, 201/21, 22, 25, 36, 37, 8

[56] References Cited

U.S. PATENT DOCUMENTS

3,736,233   5/1973   Sass et al. ................................ 201/17

Primary Examiner—Hiram H. Bernstein
Attorney, Agent, or Firm—Christie, Parker & Hale

[57] ABSTRACT

A process for the recovery of chemical values from waste solids, wherein shredded waste solids are intermixed with hot char and a carrier gas in turbulent flow and passed through a pyrolysis zone under turbulent conditions at a temperature ranging from about 300° F. to about 2000° F., with zone residence time of under 10 seconds, with subsequent segregation and recovery of volatilized organic chemical values, char and inorganic chemical values therefrom.

40 Claims, 5 Drawing Figures

FISCHER ASSAY OIL YIELDS FROM MUNICIPAL SOLID WASTE.

FIG. 3.

SPECIFIC GRAVITY OF PYROLYTIC OIL AS A FUNCTION OF WATER CONTENT.

FIG. 4.

REMOVAL OF WATER FROM PYROLYTIC OIL AS A FUNCTION OF TIME.

FIG. 5.

RESIDUAL WATER IN PYROLYTIC OIL AS A FUNCTION OF DEWATERING TIME.

PYROLYSIS PROCESS FOR SOLID WASTES

CROSS REFERENCE TO RELATED APPLICATIONS

This is a continuation of application Ser. No. 553,772, filed Feb. 27, 1975 now abandoned, which is a continuation of application Ser. No. 354,247, filed Apr. 25, 1973, now abandoned, which is a continuation-in-part of our application Ser. No. 251,074, filed May 8, 1972, now abandoned which is a continuation-in-part of application Ser. No. 61,669 filed Aug. 6, 1970, now abandoned.

BACKGROUND OF INVENTION

The disposal of both industrial and domestic solids such as trash, rubbish, garbage, etc. is becoming an immense national problem. The cost of this service presently ranks third behind public schooling and highways as a municipal expense in the United States. The cost per unit of trash disposal and the number of units of trash per person are rising annually. It is estimated that each individual in the country generates between 4-6 pounds per day of solid waste, and that the industrial output is equivalent to approximately five pounds of solid waste per person per day. The cost of disposal varies from 5 to 30 dollars per ton of trash. Previous methods of trash disposal, such as land fill, are becoming impossible, while others such as incineration are costly and result in air pollution problems. Less costly and more efficient disposal means for solid waste appear mandatory.

A second aspect of this problem is that the United States is consuming its natural resources at an ever increasing rate. In the normal materials utilization cycle, raw materials are collected, processed into useful products, utilized by consumers for varying spans of time, and then consigned to a presumably uncoverable wasteland, the city dump.

Because of these problems, many proposals have been put forth to utilize and recover values from solid wastes. Aluminum companies and glass companies will purchase used cans and bottles for reprocessing. Engineering studies and plant designs have been prepared to advance the concept of utilizing the heat produced by garbage incineration to operate electrical and desalination plants.

The idea of recovering metal values from waste solids is old in the art and is an integral part of the steel making industry.

However, the art must now develop processes to utilize both the metallic and non-metallic portion of waste solids as a raw material since these represent a large portion of the waste solids. Simple incineration of the organic portion of waste solids to produce utilizeable heat is not the solution for several reasons. The off gases produced during incineration contain air pollutants, such as $SO_2$, $NO_x$, CO and ash. These pollutants must be trapped or diminished which requires costly devices such as electrostatic precipitators, scrubbers, etc to avoid air pollution. In addition, organic waste solids are a poor fuel, and require very high combustion temperatures. What is needed is an efficient, economical method for handling the conventional waste solids produced by society which will recover chemical and fuel values from both the inorganic and organic portions of waste solids while substantially reducing the volume of gaseous effluent which must be treated to eliminate air pollution during processing.

The goal of totally recycling the raw materials contained in municipal solid wastes has become almost a "holy grail" to many of the young members of our changing society. Although the idea is old, it was they who dramatized the quest, and when Congress passed the Solid Waste Disposal Act of 1965, the American people set their sights on the same goal. More recently, when Congress passed the Resource Recovery Act of 1970, the goal was more clearly defined and the quest may now receive significant taxpayer support. The end result should not only be a beautification of the American scene, but also a reduction in the financial drain on the taxpayer who is now asked to contribute toward the achievement of this goal. The present financial drain is truly staggering. In 1968, about $4.5 billion was spent by municipalities to collect, and either bury or burn our solid wastes. If something is not done to change waste elimination procedures, the cost estimates for 1980 range from $12.5 to $16.5 billion. Although about three quarters of these costs go for antiquated and difficult to change collection procedures, there is hope to significantly reduce, or even eliminate, the current disposal costs to the urban community.

At the present time, a significant amount of discarded raw materials is being recycled to the economy by many companies engaged in America's secondary materials industry. Large quantities of metals, an appreciable amount of paper, and some glass is being collected, upgraded and reused. However, except for tin and aluminum cans in some scattered areas of the nation, only a small fraction of our reuseable resources are being recovered once they enter the municipal collection stream. A typical breakdown of municipal refuse is shown in the following Table 1, and up to now the difficult problem has been how to separate the vast amount of contaminated materials from the heterogeneous mass, and recover the potential values shown in this Table. In the past few years, American industry has tackled this problem, and answers are indeed beginning to come forth.

TABLE 1

| RECOVERABLE MATERIALS IN MUNICIPAL SOLID WASTES | | |
|---|---|---|
| Raw Material | Composition Wt. % | Estimated Recovery Eff. % |
| Group 1 | | |
| Magnetic metals | 6 – 8 | 95 |
| Non-magnetic metals | 1 – 2 | 95 |
| Glass | 6 – 10 | 80 |
| Dirt and debris Subtotal | 2 – 4 | 0 |
| Group 2 | | |
| Paper products | 48 – 55 | 50 |
| Group 3 | | |
| Unreclaimed paper and other organics | 55 | 100 |

We have invented a process which overcomes the above problems. The key to our process lies in converting the unuseable organic portion of these wastes to cleaning-burning, low-sulfur heating fuels using an efficient, low-cost, high capacity pyrolysis operation. Over one barrel of good quality, liquid heating fuel can be obtained per ton of wet as-received municipal refuse.

This process has been researched on a small continuous bench scale unit and in a pilot plant.

Our novel pyrolysis process is based upon the heating of shredded organic waste materials in the absence of air using a novel heat-exchange system. This method was developed to maximize liquid yields and thus generate the maximum liquid chemical and fuel value per ton of wastes. At the present time, organic chemical and fuel liquids yields of greater than 40 weight percent are being obtained from oven-dried, inorganic-free feed material obtained from typical as-delivered municipal solid waste. This liquid has an average heating value of from about 9000 to about 12,000 Btu per pound and can be used as a low-sulfur replacement for No. 6 fuel oil. Pyrolysis of organic waste materials also produce char, gases, and a water fraction. The distribution of these products is the most important economic factor involved in commercial pyrolysis equipment. Most other prior art units produce relatively little organic liquids unless high pressure hydrogenation is employed. An example of the distribution and analysis of the products which can be obtained in our atmospheric pressure pyrolysis process is shown in the following Table 2.

TABLE 2

PRODUCTS OF PYROLYSIS

Char fraction, 35 wt. %; Heating value 9,000 Btu/lb

| | |
|---|---|
| 48.8 wt. % | Carbon |
| 3.9 | Hydrogen |
| 1.1 | Nitrogen |
| 0.3 | Sulfur |
| 31.8 | Ash |
| 0.2 | Chlorine |
| 12.7 | Oxygen (by difference) |

Oil fraction, 40 wt. %; Heating value 12,000 Btu/lb

| | |
|---|---|
| 60.0 wt. % | Carbon |
| 8.0 | Hydrogen |
| 1.0 | Nitrogen |
| 0.2 | Sulfur |
| 0.4 | Ash |
| 0.3 | Chlorine |
| 20.0 | Oxygen (by difference) |

Gas fraction, 10 wt. %; Heating value 600 Btu/cu. ft.

| | |
|---|---|
| 0.1 mol % | Water |
| 42.0 | Carbon monoxide |
| 27.0 | Carbon dioxide |
| 10.5 | Hydrogen |
| <0.1 | Methyl chloride |
| 5.9 | Methane |
| 4.5 | Ethane |
| 8.9 | $C_3$ to $C_7$ hydrocarbons |

Water fraction, 15 wt. %

| | |
|---|---|
| Contains: Acetaldehyde | Methanol |
| Acetone | Methylfurfural |
| Formic Acid | Phenol |
| Furfural | Etc. |

Aside from the organic liquid, or oil yields of 40 wt. % obtained in a typical run, about 35% char, 10% gases and 15% water and also obtained. The gases and some of the char are used for a heat source in carrying out the process, and the oil and remaining char can be sold as a fuel or raw chemical.

The pyrolysis process is flexible with regard to feed materials. So far, the following waste products have been converted to useful chemical and fuel liquids and chars: tree bark, rice hulls, animal feed lot wastes, and shredded automobile tires. In the case of tires, the char produced is recyclable into new tire manufacturing as carbon black. Tests conducted on this product shows that modulus of elasticity and tensile strength of the compounded rubber approach to within 75 to 85% of the properties obtained when general purpose carbon black is used.

SUMMARY OF THE INVENTION

It is the purpose of this invention to provide an efficient economical method of recovering chemical values from solid wastes, thereby not only eliminating or greatly reducing the volume of the waste solids, but also having the added economic advantage or recovering chemical and fuel values from solid wastes for recycling into the economy as raw materials and which also will facilitate the segregation and recovery of metallic values from the inorganic portion of conventional solid wastes.

This invention is directed to a process for recovering chemical and fuel values from conventional waste materials, said waste materials being composed of both organic and inorganic solids which solids are capable of being divided into discreet particles by comminuting the waste material solids until the particle size of said waste material has a maximum particulate dimension of less than 1.0 inch. The process comprises forming a high velocity turbulent gaseous stream composed of a pyrolysis carrier gas, particulated waste solids and hot particulate char in a pyrolysis zone, such that the particles of waste solids and char particles are intimately admixed and entrained within the gaseous portion of the stream; heating the waste material in said stream to a temperature ranging from between about 300° F. and 2500° F. in the pyrolysis zone, the residence time of said waste solids in said zone being less than 10 seconds; and separating and independently recovering volatilized products and solids from said [heated] stream after leaving the pyrolysis zones. In our novel process, organic chemical values in the waste solids are volatilized and pyrolyzed by heat to organic chemical values which are eluted from the organic solids by vaporization and rapidly removed therefrom to minimize thermal decomposition of these values. The organic chemical and fuel values emerging from the pyrolysis zone of our process can be readily separated from the inorganic portion of the pyrolyzed waste solids by conventional classification systems. Our novel process can be beneficially utilized to recover chemical values from waste solids which are essentially organic in nature. The organic chemical effluent from the pyrolysis zone contains a raw material for further processing in accordance with the teachings of this invention. The volatile organic values, which are a valuable raw material, can be separated from the product and carrier gas and further treated to produce useful products. The metallic values in the segregated inorganic solids can be recovered therefrom by conventional processing.

During pyrolysis further char is produced and water is formed. The char is separated from the carrier and product gases and the volatiles (organic chemical and fuel values and water). The gases are separated from volatiles and the water fraction in whole or part is removed from the volatiles to yield the organic chemical and fuel values.

DETAILED DESCRIPTION OF THE INVENTION

In this invention we are dealing with the conventional solid wastes containing organic matter produced in our society. Municipal solid wastes can contain the widest variety of ingredients, e.g., glass, metal, water, organic products such as paper, automobile tires, plastics, vegetable and animal material, etc. Industrial wastes include rubber, plastics, agricultural wastes, manure, waste wood products, cannery wastes, tree bark, rice hulls, etc. This invention is directed to a process for the conversion and/or volatilization of the organic material in solid wastes to useful organic chemical and fuel values, such as hydrocarbons, oxygenated hydrocarbons and the like. While our process can handle conventional waste solids without prior segregation of the organic matter therefrom; preferably the inorganic materials are segregated from the waste solids and only that portion of the waste solids which is composed substantially of organic (carbonaceous) materials or matter is treated by the present process. The degree of segregation of organic matter from the original waste solids is variable, since total segregation may impose uneconomical cost factors on the overall process.

Waste solids can be segregated by using conventional separation equipment and processes. The presence of water in the organic wastes is preferable kept to a low value (from about 0 to about 5%), since its presence creates an aqueous fraction in the volatiles recovered in the process and imposes an extra heat load during the pyrolysis step. The aqueous fraction will contain organic solvents such as alcohols, ketones, aldehydes and acids which create an additional separation problem for recovery. Large quantities of water can be easily removed from the waste solids by conventional means, such as heating in a pre-drying process.

The waste solids segregated or unsegregated, are comminuted to a particulate found useable in our invention wherein the maximum dimension of the particles is no greater than one inch, and in the preferred embodiment of our invention the particles of the comminuted waste solids have a maximum dimension of 0.25 inch or less. Especially preferred is feed having a nominal particle size of −28 mesh. By the term "maximum dimension" is meant the largest dimension, e.g. either length or width or thickness, of the individual particles which should not exceed this upper limit. The individual particles may have smaller dimensions and can consist of chunks having essentially three dimensions, pieces of paper, plastic film, plant leaves having essentially two dimensions and/or strips of material which are essentially one dimension e.g., organic filaments. The size and shape of the particles as well as the density will affect the pressure drop within the system and the heat transfer into the particles which will necessitate adjustments of residence times within the pyrolysis zone to insure that the particles of organic matter are heated to the desired reaction temperature in the zone. For this reason we deem it preferable that the waste solids be comminuted and intermixed to produce a substantially uniform mixture. The maximum particle size is critical because particle sizes about 0.25 inch do not provide the high rate of heat transfer which is essential to the operation of this process. Since the hot char is a product of this process, the char particles will also have a particle size of less than 0.25 inch.

An essential feature of this invention is the heating of the organic waste solids to a temperature ranging from between about 300° F. to about 2000° F., preferably from about 600° F. to about 1050° F. at a very rapid heating rate of from about 1000 to about 20,000° F/second (an especially preferred range is from about 800° F. to about 1000° F.), while the waste solids are entrained in a turbulent gaseous stream composed of carrier gas, waste solids and hot particulate char. The stream is contained within a pyrolysis zone for a period of less than 10 seconds preferably from about 0.1 to about 2.0 seconds. In general we have found that organic waste solids from municipal sources can be advantageously treated by the process of our invention by heating the organic waste solids to a temperature ranging from between about 800° F. to about 1000° F. in the pyrolysis zone with a residence time ranging between about 0.1 to about 2 seconds. When our novel process is conducted so that the organic solids are heated to a temperature of about 900° F. in the pyrolysis zone a residence time of from about 0.3 sec. to about 1.3 sec. is preferred. When particulate wastes composed of automobile tires are processes, temperature, e.g., about 600° F. to about 2000° F. can be employed. The relationship between temperature and residence time can be varied to optimize yields of the liquid organic chemical and fuel values. If the temperature and/or residence times are too low, the vaporization and pyrolysis of solid waste is incomplete. When the temperature and/or residence time is too high, the pyrolysis products are degraded giving low yields of liquid chemical and fuel values.

By the term turbulent stream is meant a stream of gas flowing through a pyrolysis zone, e.g., a pipe shaped reactor vessel, wherein the flow is turbulent in nature, e.g., having a Reynolds flow index number greater than 2000 preferably about 2500.

In operation, a low ratio of about 0.2 to about 2.0 pounds of mixed gases to each pound of waste solids is all that is required to obtain a Reynolds flow index number of 2000 or greater when the pyrolysis chamber has a diameter of 3 inches or greater. For example, with a 10 inch diameter chamber, about 0.7 pounds of gas for each pound of solids is all that is required to maintain a turbulent flow in the chamber. Laminar flow in the pyrolysis zone must be avoided because such a flow system would tend to severely limit the productivity and rate of heat transfer within the pyrolysis zone. In the normal practice of this invention the carrier gas, hot char and waste solids are introduced into one end of the pyrolysis vessel and rapidly intermixed dynamically contacted with each other and blown through the vessel to permit the requisite heat transfer to take place. The heat required to pyrolyze the organic matter and remove the volatile organic chemical values can be provided all or in part from the sensible heat in the char particles, preferably all the heat is supplied by hot char. From about 2 pounds to about 12 pounds of hot char is used for each pound of solid waste. The use of hot char as the heat source in the pyrolytic zone has many advantages. Because of its heat capacity and density, a much lower volume of char is needed to heat the solid waste than would be the case if hot carrier gas alone was used. The hot char comes in intimate contact with the solid waste in the turbulent gaseous stream for efficient heat transfer.

The carrier gases found useable in this invention to effectuate the thermal elution of chemical and fuel values from the waste solids particles should be non-reactive with the char, organic matter and organic chemical values formed during pyrolysis. This gas stream should be substantially free of air, oxygen, and the like, that is the stream should contain less than 4% oxygen, preferably less than 1% oxygen. The amount of oxygen is minimized to minimize oxidation of organic values including the liquid chemical and fuel values. Exemplary of gases suitable for use as carrier gases in our invention are, nitrogen, argon, $CH_4$, $H_2$, carbon monoxide, flue gases, carbon dioxide and any other gas which will not deleteriously react with or oxidize the organic portion of the matter within the system. In a preferred embodiment of our invention we recycle the carrier product gas back to the pyrolysis zone after the organic chemical values are removed therefrom.

Preferably from about ⅛ to about 1/6 pound of carrier gas are used for each pound of solid particles (solid waste and char) passed through the pyrolysis chamber, although other ratios can be used as described above.

The particulate char is added to the waste solids in the preferred operation of our invention to provide all or a portion of the heat required for thermal elution. The selection of an optimum char-to-waste solids weight ratio will of course be dependent upon the heat transfer requisites of the system. Since part of the heat of pyrolysis can be supplied by the carrier gas, the temperature, flow rate and residence time in the reactor can be calculated by well known methods for a particular system. In general, for economy's sake we prefer to utilize the char particles for the main source of heat for the pyrolysis due to their density and the beneficial heat transfer coefficients built into the system. Some heat energy can also be furnished to the pyrolysis zone by indirect means such as electrical heating through the zone wall.

The pyrolysis portion of the system is designed to heat the carbonaceous particles to a temperature ranging from 300° to 2000° F. to recover the maximum amount of volatiles therefrom, preferably between a temperature of from about 600° F. to about 1050° F. (an especially preferred range is from about 800° F. to about 1000° F.). In the preferred embodiment, when a waste solid containing at least 70% cellulosic material is used, a temperature of from about 800° F. to about 850° F. is used with a residence time of about one second or less. The selection of a particular temperature in this range will of course be dependent upon the particular organic waste solids employed and the residence time of the waste solids in the pyrolysis zone.

The effluent from the pyrolysis zone is composed of char, volatilized organic fuel and chemical values, water (as steam), product gas, and carrier gas. The volatilized organic fuel and chemical values are cooled to a temperature below the temperature of pyrolysis to minimize degradation of the organic chemical values. The char solids can be readily separated therefrom by any conventional solids/gas separator such as a cyclone and the like. The volatilized organic chemical values, water and carrier gas can be separated and recovered by conventional separation and recovery means. When the waste solids passed through the pyrolysis zone contain inorgnic matter such as metal and glass particles intermixed with the char produced by the organic portion of the waste solids, the organic and inorganic solids can be readily separated by conventional air classification systems. In fact the pyrolysis of the organic solids increases the density differential between such solids and actually facilitates the separation. However, the solids containing both inorganic and organic solids can be recycled through the pyrolysis zone to provide the necessary heat without prior separation. When the pyrolyzed solids are separated, the latent heat found in the inorganic solids is utilized to provide heat for the pyrolysis zone in order to increase the efficiency and economics of the system e.g., the heat of the inorganic solids can be used to heat the recycle gases. Alternately, the inorganic solids can be separated from the char by conventional means if desired. Of course it will be obvious to those skilled in the art that the hot inorganic solids recovered from our invention are in an excellent form and condition for further processing by conventional processes to recover metallic or inorganic chemical values therefrom and that this factor adds further attractive economics to our novel process.

By the term volatilized hydrocarbons as used in this application is meant the product gases produced by pyrolysis of the waste solids and in general these consist of condensable hydrocarbons which may be removed simply by containing the product gases with condensation means, and non-condensable gases such as carbon dioxide, carbon monoxide, hydrogen and methane and other hydrocarbon gases which are not recoverable by ordinary condensation means. The product gas stream also contains undesirable gaseous products such as $NH_3$, $H_2S$, methyl chloride and water which should be removed from the product gas stream by conventional means such as cooling and chemical scrubbing, etc. After the condensable organic chemical values and the undesirable gaseous products have been removed from the product gases, the resulting gases can be utilized for process heat and finally as the carrier gas for the pyrolysis.

Initially, the system is started up by using hot char from other sources, but after waste solids have been pyrolyzed as described herein, sufficient hot char is produced as required by the system, and in fact is produced in excess. The excess char can be readily utilizable in further processing to provide new materials, which enhances the total economics of our process, such as fuel for use in a power plant or a raw material source for the chemical industry. These excess char can be briquetted by conventional means and utilized as a source of fuel or coke.

The excess char particles produced by our novel process, which contains between about 10 and 40% volatiles, can also be degasified, if desired, by heating to temperatures ranging from about 1200° F. to 1800° F. or higher to yield a hydrogen-rich gas which is saleable as premium fuel. The gas can be upgraded into pure hydrogen, or used for hydrotreating the heavier volatilized chemical values produced during the present process.

Char degasification can be carried out in several ways which, in substance, amounts to direct or indirect heating. In direct heating, the char is contacted with sufficient oxygen from a suitable source, such as air, to bring the stream by controlled combustion up to the desired degasification temperature. This can be accomplished in a transport reactor similar to the pyrolysis reactor or in a fluidized bed reactor.

Preferably, the char is degasified by indirect heating which yields a gas stream containing 70 or more percent by volume hydrogen. This may be accomplished in a reactor similar to a tubular heat exchanger in which the char is blown through the tubes in a dense or dilute phase and fuel is burned with air or another suitable source of oxygen in adjacent tubes to supply the heat required for degasification.

Alternatively, the same result can be accomplished by the combustion of the fuel in tubes located in a fluidized bed of the char. After separating the char from the evolved gases, the char is cooled for ultimate use as a high grade fuel.

Where it is desired to produce a low sulfur char, from waste solids containing large amounts of sulfur, sulfur reduction can be accomplished during pyrolysis, superheating and/or degasification of the resultant char.

Desulfurization during pyrolysis can also be achieved by having a solid sulfur acceptor, such as lime or iron oxide, present in the zone during pyrolysis. The sulfur combines with iron oxide to form pyrrhotite. Both are iron oxides, and pyrrhotite is magnetic and can be removed, in addition to any iron pyrite naturally present, from the product char by magnetic separation. This can conveniently be accomplished with minimum cooling of the char to conserve the heat requirements for processing.

Desulfurization may also be achieved during pyrolysis by enriching the gas stream with hydrogen, preferably part of the hydrogen released during degasification. The hydrogen fed to pyrolysis zone reacts with sulfur to form hydrogen sulfide which is later removed by conventional means such as scrubbing; hydrogen also enriches the volatilized hydrocarbons. In the preferred embodiment of our invention we use a carrier gas containing at least 20 parts by volume hydrogen based upon the total volume of carrier gas used.

Desulfurization may also be achieved by superheating the char by employing as the transport gas, a gas enriched with hydrogen. This gas reacts with the sulfur in the char to achieve additional sulfur reduction of the product char. As with desulfurization during pyrolysis, the hydrogen employed obtained by the recycle of off gases from char degasification before or after purification.

Where it is desired to recover the sulfur from the product char, the char which is already at an elevated temperature is merely heated to about 2300° to 2800° F. at ambient pressures in the non-oxidizing environment for periods up to about 20 minutes. This results in substantial sulfur reductions from the char.

When the char is degasified by indirect heating, maintaining pressure at from about 15 to about 100 psia and using a hydrogen-rich transport gas enhances additional sulfur removal during degasification. Under these conditions char can be desulfurized as well as degassed within reactor times of about ten minutes. This desulfurization can be achieved since the inorganic sulfur has been essentially removed by the sulfur acceptor in previous treatment.

The following description of the drawing teaches a typical example of the present process and is not intended to be a limitation thereof.

Figure 1:
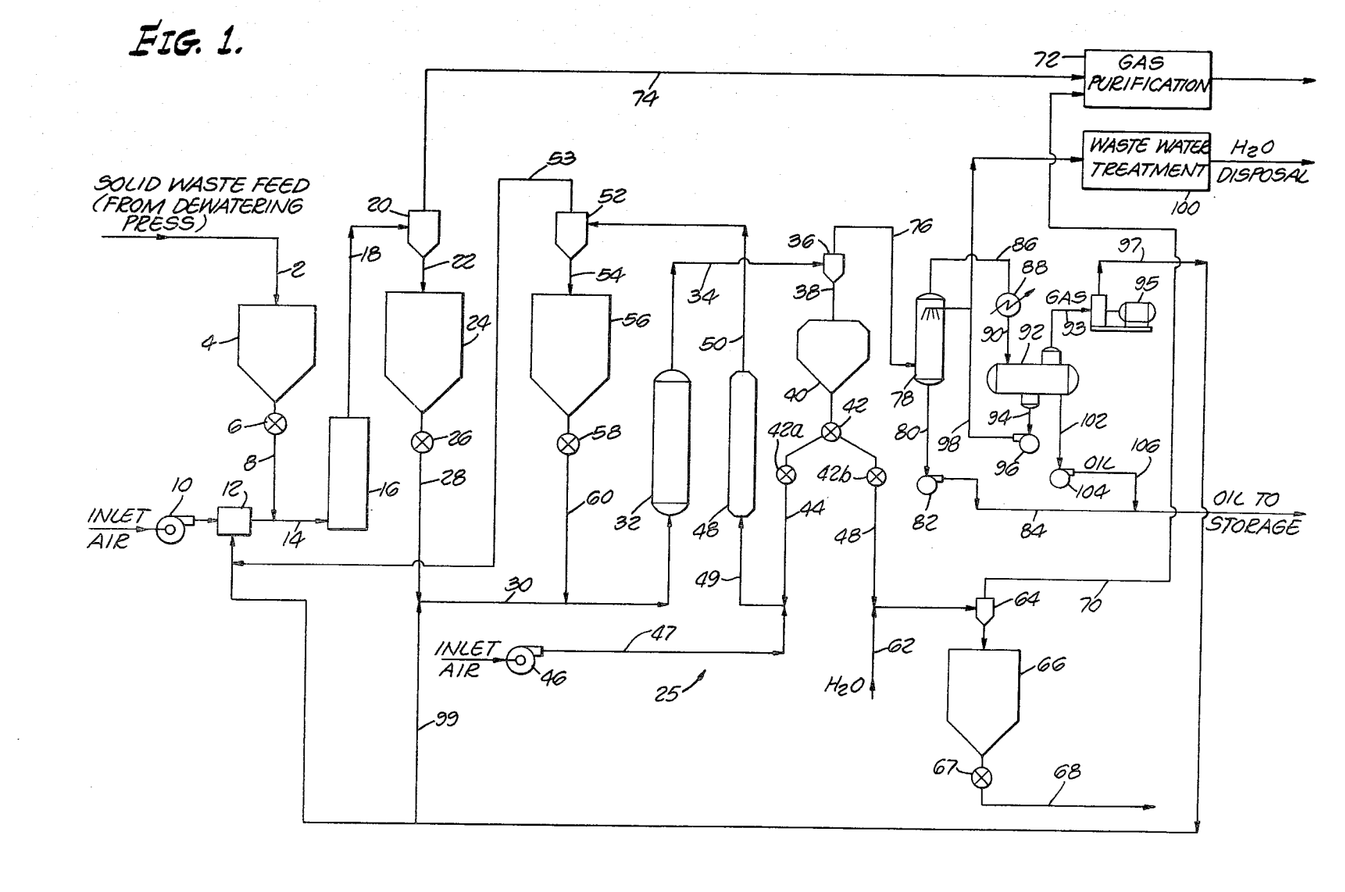
FIG. 1 illustrates a schematic outline and arrangement of equipment for carrying out the novel process of this invention.

Referring to the drawing, the shredded particulate solid waste containing organic solids, or pulp from a dewatering press (not shown) enters the boundary of a thermal elution unit through a line 2 in a feed hopper 4 for surge storage. The solid wastes are metered through a valve 6 and enter a line 8 where they are combined with a recycle gas from a mixing vessel 12. The feed and mixed gases pass through a line 14 are dried in a dryer 16 if required or economically desirable. The dried wastes and gases then pass through a line 18 to the cyclone separater 20 to separate the wastes from the gases. The gases are removed through a line 74 and enter a gas purification unit 72. The dried solid wastes leave the cyclone separater 20 through a line 22 and are stored in a surge vessel 24. The dried wastes are metered into a pyrolysis system 25 through a valve 26 and pass through a line 28 where they are combined with hot recycled gas from a line 99. The stream of hot gas, and waste are combined and transported through a line 30 wherein they are combined with hot recycle char having a temperature of about 160° F. and volatile gases having a temperature of about 500° F. transported through a line 60. The stream of gases, char and waste is passed into a pyrolysis reactor vessel 32 through the line 30. In the pyrolysis reactor 32, the particulate wastes are heated to a temperature ranging from about 500° F. to about 1500° F. by the hot recycle char, volatile gases and recycle gases. The organic matter in the waste is pyrolyzed and volatilized in the pyrolysis reactor 32 to produce chemical and fuel values which are normally vaporized at the pyrolysis temperature to form product gases. The stream of gases, char, and product gases are removed from the reactor vessel 32 through a line 34 to a cyclone separater 36 wherein the gases are separated from the char and removed through a line 76. The gases are cooled in a quench tower 78 to a temperature between about 900° F. and 1600° F. The condensate from the quench tower 78 leaves through a line 80 and is pumped by a pump 82 into a line 84 which leads to a oil storage vessel (not shown). The noncondensed gases from the quench tower 78 exit through a line 86 and are further cooled in a condenser 88. The further cooled gases and condensed liquids leave the condenser 88 through a line 90 and pass into a phase separator 92. There are three phases present at this point; gas, oil, and water. The gas leaves the phase separator 92 through a line 93 and is compressed for recycling in a compressor 95. The compressed gases are returned to the pyrolysis system from the compressor 95 through a line 97, preferably after being heated. A portion of the compressed gases is fed directly into the pyrolysis reactor 32 through a line 99 and the line 30 wherein it is mixed with pyrolysis feed from the line 28 and char from the line 60. The remaining compressed gases are sent to the mixing vessel 12 and used to dry the solid wastes as described above. Additional fuel, or other waste heat may also be used for this drying step.

The water from the phase separator 92 is removed through line 94 and pumped by a pump 96 into a line 98 to be processed by conventional means in a waste water treatment facility 100. The water after treatment is then disposed of in a conventional manner. A portion of the separated water is also recycled in the quench tower 78 as a cooling medium. The oil from the phase separator 92 is removed through a line 102 and pumped by a pump 104 through a line 106 and the line 84 to the oil storage vessel (not shown).

The char from the pyrolysis reactor vessel 32 is separated from the entrained gases in the cyclone separator 36 and is removed by a line 38 leading into a char receiver 40. Some of the char is used for process heat and this portion is metered by a valve 42 from the char receiver 40 into a line 44. This process char is combined with combustion air from a blower 46 and a line 47, and fed into a char heater 48 via line 49. A portion of the char is burned in the char heater 48 to raise the overall temperature of the char to about 1600° F. The heated char leaves the char heater 48 through line 50 into a cyclone separator 52 where the combustion gases are separated from the hot char. The combustion gases are removed by a line 53 and combined with the hot compressed gas in a line 97 which are used for drying the wet solid wastes in the dryer vessel 16. The hot char from the cyclone separator 52 is removed through a line 54 into a hot char storage receiver 56. The hot char is metered from the receiver 56 into the pyrolysis portion of the system 25 by a valve 58 and passes through the line 60 into the line 30. The char from the char receiver 40 which is not used for process heat is metered in the valve 42 and a valve 42b and passes into line 48. This char is mixed with process water from a line 62 wherein the water flashes into steam which entrains the hot char and carries it into a cyclone separator 64. The resulting steam (at pressure of 150 psi) is removed from the cyclone separator 64 by line 70 where it leads to the gas purification unit 72. The hot char from cyclone 64 enters a product char storage vessel 66 and is passed to a compactor or the like through a valve 67 and a line 68.

As staged above, the solid waste that can be employed in the present invention includes municipal garbage, industrial waste such as tree bark, scrap rubber, rubber grindings, old tire rubber, ground tire carcuses, sugar refinery waste, corn cobs, rice hulls, animal matter from slaughter houses or rendering plants, sawdust, and the oily discharge obtained from ships when they clean their tanks. Municipal wastes and wastes from vegetable or plant raw materials contain more than 70% cellulose base material and produce a characteristic oil when employed in the present process. For example, municipal waste contains from 70 to 90% cellulose material, produces a novel oil of the present invention.

When a solid waste such as municipal waste or waste from vegetable matter, which contains at least 70% by weight of a cellulose material, is employed in the present process, a characteristic oil is produced which is an oxygenated, complex, organic fluid. Up to about 40%, and in some cases up to 85%, of oil is soluble in water. Solubility in water goes through a minimum of 59% at neutral pH, increases somewhat to 63% at a pH of four, and becomes 67% at a pH of two. Ammonia will dissolve about 70% of the material, while aqueous caustic at 0.5% concentration is so effective a solvent that the solid residues from benzene azeotropic water determinations are dissolved easily. Glycerol, supposedly similar to the parent material in functionality, is a relatively poor solvent, dissolving only 15 to 30% by weight of the oil. The oil is relatively insoluble in nonpolar solvents, such as carbontetrachloride, heptane and decane and benzene, toluene, dodocane and hexane dissolve less than 10% of the oil. However, quite surprisingly, we have found that the liquid product of the present process can be successfully blended or mixed with various No. 6 fuel oils. No. 6 fuel oils vary considerably depending upon the oil source. We have successfully blended the liquid product with No. 6 fuel oil from an Alaskan field, a No. 6 fuel oil employed by the San Diego Gas and Electric Co. and two No. 6 fuel oils from South American oil fields. We did find that the liquid product was not compatable with a diesel oil and a light, low sulfur No. 6 fuel oil obtained from Combustion Engineering. The reason for this incompatability is not known at the present time. We have found that the ignition stability of properly atomic atomized liquid product or blends of liquid product with No. 6 fuel oil are equal to that obtained with No. 6 fuel oil only. We have also found that liquid product alone or blends of liquid product No. 6 fuel oil can be successfully burned in a utility boiler. Thus it is clear that the liquid product of the present process can be used as a liquid fuel for steam plants and generating plants.

The oil contains from about 10 to about 15% titratable carboxylic acids, the acids have a $pH_a$ of about 4.5. The viscosity of the oil is considerably higher than No. 6 fuel oil. The oil is at least 95% soluble in acetone as well as other organic polar solvents such as quinaline, methanol, ethanol and the like. The oil has a relatively low pH of between about 1 and 3 measured either in water or methanol. The oil usually contains from about 10 to about 40% water which can be removed by distillation or extraction methods known to the art. The oil contains small amounts (less than 5%) of the following compounds: acetaldehyde, acrolein, furfural, 5-methyl, 2-furfuraldehyde, pyruvaldehyde, phenol, acetol, furfuryl alcohol, methylethylketone, pyruvaldehyde, phenol, acetol, furfuryl alcohol, methylethylketone, acetone, cyclohexanone, 2-hydroxy-3-methyl-2-cyclopenten-1-one, acetic acid, formic acid, glycolic acid, lactic acid, dilactic acid, methyl formate, and 2-methyl furan. The largest single chemical component of the oil is believed to be levogleucosan and other degredation products such as 5-(hydroxymethyl)-furfuraldehyde, glucofuranose and glucopyranose, caused by the scission of the 1, 4 glygosidic linkages of cellulose followed by intramolecular rearrangement of the monomer units. Apparently, the heating of the hydroxyl groups of the cellulose matter during pyrolysis causes, in addition to dehydration, degredation of some of these groups to carboxyl groups rendering the resulting oil soluble in alkali and causing a series of color changes of the resulting oil from yellow through reddish-brown and finally to black. All the oil produced to date from waste containing 70% or more cellulosic material has had a dark reddish-brown color and is quite soluble in alkali. In fact, a diluent solution of caustic soda has been found to be an ideal solvent for removing the oil from surfaces, clothing and skin.

Elemental analysis of oil produced by the present process from wastes containing organic matter, such as rubber tires, tree bark or cellulosic material, shows that the oil is made up of the following elements by weight: from about 40 to about 90% carbon, from about 2 to about 10% hydrogen, from 0 to about 40% oxygen, from 0 to about 4% sulfur, from about 0.1 to about 3% nitrogen, from 0 to about 1% chlorine.

Elemental analysis of the oil obtained from waste material containing about 70% cellulosic material shows that the oil is made up of the following elements by weight: from about 52% to about 60% carbon, from about 6% to about 8% hydrogen, from about 1% to about 2% nitrogen, from about 29% to about 33% oxygen and the remainder consisting of small amounts of sulfur, ash and chlorine. The empirical formula best fitting the oil anaylsis is $C_5H_8O_2$. It is interesting to note that the elemental analysis of a typical municipal waste feed shows that it contains about 46% carbon, about 6% hydrogen, about 6% ash, about 38% oxygen, and about 1% nitrogen with the remainder made up of smaller amounts of sulfur and chlorine. This indicates that during the present pyrolysis process, a greater portion of oxygen is lost than any other element, probably as $CO_2$ and $H_2O$.

The composition of the oil obtained by pyrolysis of solid waste according to the present invention depends somewhat on both the quench temperature and further treatment. Pyrolytic oil is made up of hundreds of compounds varying in molecular weight from 32 to perhaps 10,000 or more, with boiling points ranging from 55° C. to >360° C. About half the material is not capable of being distilled. Some state of oxygenation is always present so that the carbon to oxygen (C/O) ratio usually ranges between one and two for most fractions. Specific gravities from 1.1 to 1.4 are typical of organic fluids which are oxygenated.

A viscosity of the oil is greatly affected by temperature, water content, and polymerization. At this stage of development, thermal and oxidative stabilities of the oil have not been fully assessed, but the oil appears to be adequately stable below 140° F. The dependence of oil composition on residence time during pyrolysis has not been fully delineated. The factors affecting or modifying oil viscosity are tar content, dissolved solids, moisture, and temperature. The history of the oil can affect the first two, while moisture and temperature can be tailored to meet market needs. It is thus possible to alter the physical properties of the oil by fairly simple control methods.

Temperature dependence for a typical pyrolytic oil prepared from a sample of municipal waste, Palo Alto, California shows a two-fold decrease in viscosity for a 30° F. rise in temperature or a 10% relative increase in moisture cpntent. Near 212° F. steam evolution causes bubbling and frothing, unlike the typical hydrophobic fuel oil. A convenient reference viscosity for low water content material was obtained for an oil which had spent a minimum time at reactor temperature. At 113° F., the oil with a water content of 6.4% had a viscosity of 8000 centipoises or 28,500 Saybolt Universal seconds. The value represents an average of measurements made while increasing and decreasing the temperature slowly to avoid hysteresis effects. Reduced viscosities could be obtained by condensing a product with more moisture. The oil is non-Newtonian in its behaviour and displays increased viscosity at low shear rate.

Figure 3:
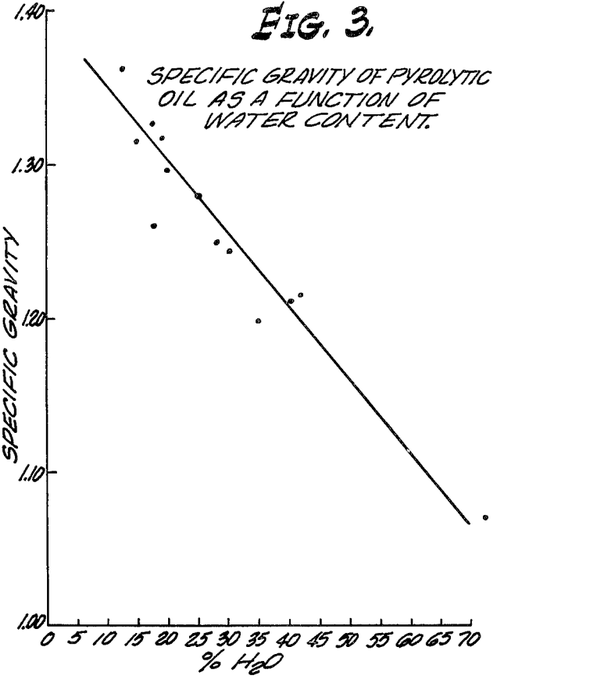
FIG. 3 is a graph showing the specific gravit of the oil of the present invention as a function of water content.

In view of the complex nature of the oil, an attempt was made to centrifuge different density fractions from a sample containing 28% cup The three portions obtained were diverse in water content, viscosity, C, H, O ratios, and density. The top cut was waxy, somewhat viscous, contained only 3% water, and could be represented as $C_5H_{10}O_2$. It is tempting to suggest a contribution by such molecules as tetrahydrofufuryl alcohol. The middle cut contained 42% moisture and C, H, O in the ratio 5:6:2. The bottom cut was thick, pasty and contained 5% $H_2O$. The simple formula for this material is $C_4H_4O_2$. The densities for structures consistent with multiples of this formula and its logical precursors exceeded 1.18 g/cc. Again the complexity in composition and fluidity of the system is demonstrated. The dependence of the density of the oil on water content is shown in FIG. 3. The data are represented by the equation:

$$\rho \text{ (g/cc)} = 1.40 - 0.0047 \text{ (\% H}_2\text{O)}$$

Water was determined by benzene azeotropic distillation and corrections were made for any low boiling organic compounds found in the aqueous layer of the distillate. Combustion and chromate oxidation analysis both indicated a 5% organic compound content in the aqueous layer.

Figure 4:
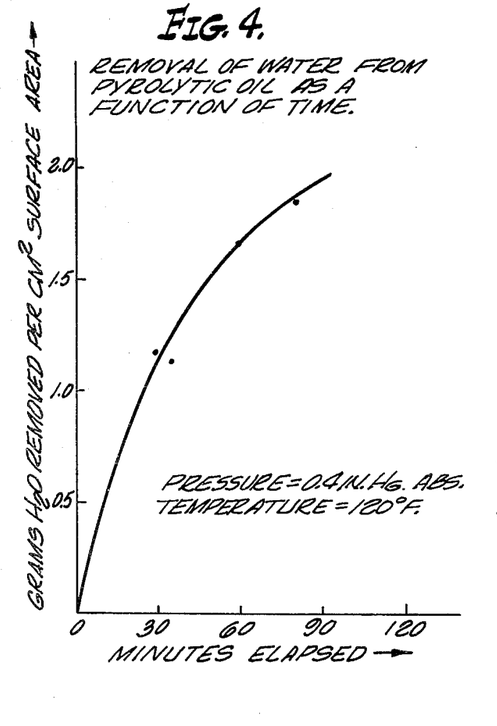
FIG. 4 is a graph showing the rate of water removal from the oil of the present process with respect to time.
Figure 5:
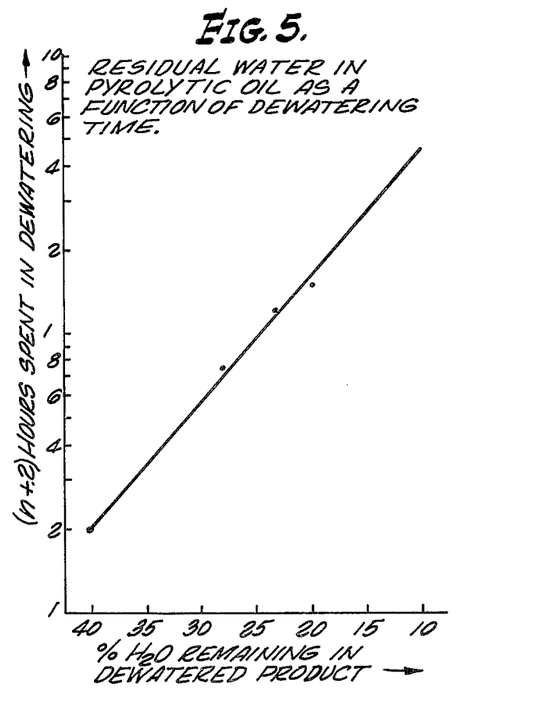
FIG. 5 is a graph showing the residual water in the oil of the present invention as a function of dewatering time.

Data gathered in the laboratory dewatering of oil, support the contention that the last portions of water are the most difficult to remove. FIG. 4 shows total water removed per unit surface area as a function of time. In FIG. 5 the time required is plotted as a function of the percentage water remaining. The data fit a semi-log plot and infer that the last 10% $H_2O$ may be tedious to remove. It is felt that viscosity increases are a more important factor than vapor pressure, although the latter may certainly contribute to the time dependency.

When enough water is added to the as-produced pyrolytic oil to raise its moisture content to 80%, solids begin to deposit. These solids were found to be only partially soluble in methanol, which suggests that the compounds involved have an irreversible solubility. The water-insoluble, methanol-insoluble portions (20% by weight) have an empirical formula of $C_6H_{10}O_5$, suggestive of anhydroglucosan polymers. The methanol-soluble portion contains solids which have an apparently degenerate structure, not given to polymerization. The empirical formula shows a C/O ratio of 2:1 as in $C_6H_7O_3$. Further water addition to the diluted oil results in precipitation of more of the second type of methanol soluble solids. In the mechanisms proposed for the pyrolysis of cellulose at high heat flux conditions, the first stable liquid product characterized as a high yield product is levoglucosan, $C_6H_{10}O_5$. This compound can undergo further thermal scissions, dehydration, rearrangements, and even polymerization to compounds with molecular weights in the hundreds of thousands. Second generation products such as 5-hydroxymethyl furfural have also been frequently observed and characterized as a fairly major product when minimum fragmentation or charring occurs. It is interesting to note that the empirical formula for 5-hydroxymethyl furfural is $C_6H_6O_3$, close to the methanol-soluble material recovered in quantity by adding water to the pyrolytic oil. Water-soluble components, representing 60 to 65% of the dry weight of oil, can be represented by the formula $C_5H_6O_2$, demonstrating the further dehydration which directly precedes rupture of the five membered ring in such compounds. Such rupture would lead to carboxylic acids, and fragments which in turn give tars and other condensed structures. The oil is more acidic than citric acid, and about as acidic as acetic acid. This behaviour is not unexpected for a polyfunctional, acidic, water-containing material.

The oil has a specific gravity of between about 1 and about 2, nominally 1.30, and a calorific value of from about 5000 to 25,000 Btu per pound, nominally 10,600 Btu per pound on the dry basis, one barrel can be burned to release 4.83 million Btu. This oil is much lower in sulfur (0.1 to 0.2% by weight) than many residual fuels, but when moisture-free, it is somewhat viscous at room temperature due to the presence of high molecular weight tars. However, since the oil is about 70% water soluble, its handling characteristics may be suitably tailored by controlling the amount of water present. Experience has shown that a moisture content of 10% by weight allows the oil to be handled satisfactorily. The water content and viscosity can be controlled by adjustment of the operating conditions at the quench and scrubbing steps of the product recovery system.

The flash point of the oil has ranged from 90° to 255° F., in tests with the Pensky-Martins closed up apparatus depending upon the cooling temperature at the quench step. Quenching to a temperature of 140° to 160° F. the product oil contains light, volatile fractions which appreciably reduce the flash point. When the quench is conducted at temperatures of about 200° F., the proportion of light ends present will be significantly reduced. While this quench temperature will lower oil yield by a very small percentage, it will effectively increase the oil flash point. As in the case of viscosity, conditions at the quench unit can be varied to give whatever value is needed for flash point.

A typical analysis of the oil is presented in the following table.

TABLE 3

CHARACTERISTICS OF PYROLYSIS PRODUCTS

| Oil Characteristics | Nominal+ | Experimental Range* |
|---|---|---|
| Heating Value: | $4.8 \times 10^6$ Btu/bbl | $4.8 \times 10^6 - 6.7 \times 10^6$ |
| Ash content: | 0.2% (by wt.) | 0.20 – 0.60 |
| Ultimate analysis: | | |
| Carbon | 57.5% (by wt.) | 54.5 – 70.6 |
| Hydrogen | 7.6 | 6.9 – 9.3 |
| Nitrogen | 0.9 | 0.6 – 1.5 |
| Oxygen | 33.4 | 18.9 – 33.4 |
| Sulfur | 0.1 | 0.10 – 0.20 |
| Chlorine | 0.3 | 0.08 – 0.41 |
| Moisture content: | 6.3% (by wt.) | 4.2 – 10.3 |
| Flash point: | 225° F. ± 15°++ | — |
| Density at 70° F.: | 1.3 gm/cc | — |
| Solubility tests: | | |
| Percent by weight soluble in: | | |
| | Water: 84% | |
| | Pentane: 10% | |
| | Benzene: 47% | |
| | Quinoline:100% | |
| Char characteristics | | |
| Heating value: | 9,000 Btu/lb | 6,000 – 9,700 |
| Ash content: | 31.8% (by wt.) | 21.8 – 50 |
| Volatile content: | 14% (by wt.) | 10 – 40** |
| Ultimate Analysis: | | |
| Carbon | 48.8% (by wt.) | 37.1 – 61.3 |
| Hydrogen | 3.9 | 2.0 – 4.0 |
| Nitrogen | 1.1 | 1.0 – 1.5 |
| Oxygen | 12.7 | 12.2 – 17.2 |
| Sulfur | 0.28 | 0.28 – 0.65 |
| Chlorine | 0.22 | 0.22 – 0.45 |
| Moisture content: | 0.6% (by wt.) | 0.0 – 1.44 |

+Based on optimum conditions to date
*Range depending upon process conditions
++Based on Cleveland Open Cup technique
**The char formed during the pyrolysis contains from about 20 to about 40% volatiles by weight; however, the average volatile content is lower because the recycle char loses some of its volatiles during every pass through the pyrolysis zone.

As the above table indicates, the oil produced by the present process has a heating value comparable to about $4.8 \times 10^6$ Btu/42 gal. bbl or about 75% of the heat value of No. 6 fuel oil ($6.3 \times 10^6$ Btu/42. bbl). The above table also shows that the oil has a density appreciably greater than that of water. Thus water spills of the present oil would not present the same ecological problems that most petroleum oils present. For example, if a tanker filled with the oil of the present invention ruptured a tank or accidentally discharged oil into the sea, the oil would rapidly sink into the water and dissolve in the water. Although tests have not been completed at the present time, it appears that the present oil is completely biodegradable.

For purpose of this invention, the term "cellulosic material" means material containing cellulose or products derived from cellulose. Typical cellulosic materials include: paper, tree bark, sawdust, and vegetable waste, such as leached sugar cane, leached sugar beets, rice hulls, carrot tops, fruit skins, fruit pits, tree trimmings, leaves and the like.

EXAMPLE 1

To illustrate the effect of pyrolysis on solid waste, a comminuted sample of municipal waste from Middletown, Ohio was oven-dried 105° C. and pyrolyzed at 950° F. Prior salvaging was conducted on the sample, removing nearly all the metal, glass and other inert materials, and about 50% of the paper fibers.

The primarily organic residue of this municipal solid waste was continuously fed into the pyrolysis reactor at about three pounds per hour, and the particle size range from about 50 mesh to ½ inch. The results and chemical analyses are shown in Table 4. The heating values are calculated from the chemical analyses.

TABLE 4

| Char fracton, 36.3 wt. %; heating value 9,700 But/lb | | |
|---|---|---|
| 61.3 | wt % | Carbon |
| 2.8 | | Hydrogen |
| 1.5 | | Nitrogen |
| 0.4 | | Sulfur |
| 21.8 | | Ash |
| 12.2 | | Oxygen (by difference) |
| Oil fraction, 28.8 wt. %; heating value 14,700 Btu/lb | | |
| 70.6 | wt. % | Carbon |
| 9.3 | | Hydrogen |
| 0.6 | | Nitrogen |
| 0.2 | | Sulfur |
| 0.4 | | Ash |
| 18.9 | | Oxygen (by difference) |
| Gas fraction, 14.5 wt. %; heating value 260 Btu/cu ft | | |
| 0.1 | Mol % | Water |
| 22.2 | | Carbon monoxide |
| 63.2 | | Carbon dioxide |
| 2.1 | | Hydrogen |
| 2.2 | | Methyl chloride |
| 6.2 | | Methane |
| 1.8 | | Ethane |
| 2.2 | | $C_3$ to $C_7$ hydrocarbon |

Water fraction, 20.4 wt. %; contains methanol, acetic acid etc.

Our tests have indicated that most of the cellulosic based waste feeds yield very similar products, as may be expected. However, since rubber has a very different chemical composition, the yields of this material are different from the cellulosic based feedstocks and the operating conditions may be different. Results obtained from rubber are of particular laboratory interest since the char has been found to be directly recyclable into new tire manufacturing as an excellent carbon black substitute. These favorable results have been confirmed in rubber compounding tests conducted by two of America's largest tire manufacturers. The product distribution from the pyrolysis of rubber from tires at a pyrolysis temperature of about 900° F., a residence time of about 0.1 to about 0.3 seconds is shown below:

| Product | Yields by Wt. % |
|---|---|
| Char | 40 wt. % |
| Oil | 50 wt. % |
| Gas | 10 wt. % |

Another sample of comminuted of municipal waste was dried and pyrolyzed at about 950° F. according to the process of the invention. Prior to pyrolyzing the sample, substantially all the metal, glass and other inert materials were removed from the sample.

The remaining organic material was continuously fed into the pyrolysis reactor at the rate of about 3 pounds per hour. The particle size of the solid waste was from about 50 mesh to about ⅛ inch. The chemical analysis of the resulting products is shown in the following table:

TABLE 4A

Char fracton, 20.0 wt. %; heating value 9,000 Btu/lb

| | |
|---|---|
| 48.8 wt. % | Carbon |
| 3.9 | Hydrogen |
| 1.1 | Nitrogen |
| 0.3 | Sulfur |
| 31.8 | Ash |
| 0.2 | Chlorine |
| 13.9 | Oxygen (by difference) |

Oil fraction, 40.0 wt. %; heating value 10,500 Btu/lb

| | |
|---|---|
| 57.5 | |
| 7.6 | Hydrogen |
| 0.9 | Nitrogen |
| 0.1 | Sulfur |
| 0.3 | Ash |
| 0.3 | Chlorine |
| 33.4 | Oxygen (by difference) |

Gas fraction, 27.0 wt. %; heating value 550 Btu/cu ft

| | |
|---|---|
| 0.1 Mol % | Water |
| 42.0 | Carbon monoxide |
| 27.0 | Carbon dioxide |
| 10.5 | Hydrogen |
| <0.1 | Methyl Chloride |
| 5.9 | Methane |
| 4.5 | Ethane |
| 8.9 | $C_3$ to $C_7$ hydrocarbon |

Water fraction, 13.0 wt. %; contains methanol, acetic acid, etc.

EXAMPLE 2

To illustrate the effect of pyrolysis on communited municipal solid wastes without paper fiber removal, but with the metal, glass and inert materials removed as in Example 1, the results shown below were determined:

Char fraction, 43.6 wt.%
Oil fraction, 23.7 wt. %
Gas fraction, 13.5 wt. %
Water fraction, 19.2 wt. % EXAMPLE 3

Municipal wastes having the composition shown in the following Table 5 were segregated into the three identified groups.

TABLE 5
CONSTITUENTS IN MUNICIPAL SOLID WASTES

| Component | Compiled by Solid Waste Management Office Wt. %, dry basis | Compiled by Black Clawson, Middletown, Ohio Wt. %, dry basis |
|---|---|---|
| Group 1 | | |
| Metals | 11 | |
| Glass | 10 | |
| Dirt | 3 | |
| Sub total | 24 | 27 |
| Group 2 | | |
| Food wastes | 17 | |
| Plastics | 5 | |
| Yard Wastes | 4 | |
| Cloth | 3 | |
| Wood | 2 | |
| Sub total | 31 | 20 |
| Group 3 | | |
| Paper | 45 | 53 |
| Total | 100 | 100 |

The Groups 2 and 3 of the Black Clawson Company waste were combined and shredded to −24 mesh to yield a waste feed having about 90% of the inorganics removed. This waste feed was oven-dried to less than 5% moisture and pyrolyzed at about 500° C. (about 932° F.) at atmospheric pressure without hydrogenation according to the method of Example 1 to yield products identified in Table 4 above.

EXAMPLE 4

The oil fraction of Example 3 was subject to atmospheric distillation to yield nine cuts which are identified in the following Table 6.

TABLE 6
ATMOSPHERIC DISTILLATION OF SOLID WASTE PYROLYSIS OILS

| Cut | Distillation temperature range, °F. | % by weight of product |
|---|---|---|
| 1 | 220 to 270 | 10.3 |
| 2 | 270 to 320 | 9.9 |
| 3 | 320 to 370 | 7.0 |
| 4 | 370 to 420 | 12.1 |
| 5 | 420 to 470 | 3.5 |
| 6 | 470 to 520 | 2.3 |
| 7 | 520 to 570 | 1.3 |
| 8 | 570 to 620 | 1.4 |
| 9 | 620 to 654 | 0.7 |
| Residue | | 32.4 |
| Loss + Holdup | | 19.1 |

Mass balance for the run producing the oil was 80%, and of the remaining 20% unrecovered mass, 1/5 is estimated to be due to distillation losses. It is estimated that 9 to 13% of the weight of the proeuct oils were lost because of the low boiling fraction that boiled below 220° F.

EXAMPLE 5

Segregated shredded municipal waste (+75% cellulosic material, −10% inorganic matter) was subjected to the pyrolysis of Example 1 employing a turbulant gaseous stream comprising by weight 16⅔% carrier gas, 16⅔% particulate municipal waste (−10 mesh) and 66⅔% particulate char. The particulate solid waste was heated to a temperature of about 950° F. and had a residence time of about 1.1 sec in the pyrolysis zone. The liquid organic chemical and fuel values, that is the oil product, had a moisture content of 20% by weight. The solubility of the oil was tested for several solvents and solutions, the results of which are shown in the following table 7.

TABLE 7
OIL AT 20% MOISTURE CONTENT

| Solvent | % solubility of oil by weight |
|---|---|
| Aqueous caustic | 95% |
| Methanol | 95 |
| Acetone | 95 |
| Quinoline | 98 |
| Water  pH 4 | 63 |
|     pH 6 | 59 |
|     pH 2 | 67 |
| Ammonia (pH 10) | 70 |
| Benzene | 8 |
| Toluene | 8 |
| Hexane | 2 |
| Glycerol 15–40% depending on absence of large molecular weight organic chemical and fuel values | |

The oil product shows decreasing solubility in methanol and acetone when thermally degraded and/or exposed to oxygen (air).

EXAMPLE 8

Rice hulls (37.7% carbon, 5.3% hydrogen, 0.4% nitrogen, 0.02% sulfur, 0.18% chlorine, 18.8% ash of which 78.9% was $SiO_2$, 33.5% oxygen and 4.1% $H_2O$) were shredded to −24 mesh and pyrolyzed (932° F.) according to the method of Example 1 to yield the following products: oil 31%, char 56% and gas 13%. The char was made up of 63.4% carbon, 2.0% hydrogen, 2.0% nitrogen, 0.5% sulfur, 0.11% chlorine, 27.4% ash (of which about 75% was $SiO_2$) and 4.6% oxygen.

EXAMPLE 9

Tetracosane is ground to minus 100 mesh and pyrolyzed according to the present process. The tetracosane is combined with a turbulent gaseous stream which is substantially free of oxygen and inert to the tetracosane. Hot, particulate char (1800° F.) is added to the turbulent gaseous stream (5 pounds of char for each pound of tetracosane) and the entire mixture is passed into a pyrolysis zone for a residence time of between 1 and 5 seconds to heat the tetracosane to a temperature of about 1500° F. to form liquid chemical and fuel values. The values are rapidly cooled after leaving the pyrolysis zone to a temperature below 500° F. The elemental analysis of liquid chemical and fuel values is as follows: about 85% carbon, about 15% hydrogen and about 0% oxygen.

EXAMPLE 10

The method of Example 9 is repeated using 2 pounds of char to each pound of tetracosane and residence time of between 5 and 10 seconds to yield a liquid chemical and fuel value similar to the value recovered in Example 9.

EXAMPLE 11

Napthalene is ground to powder (minus 80 mesh) and combined with a carrier gas which is substantially free of oxygen and inert to naphthalene and hot char (1600° F.) in the following weight ration: 1:0.2:2 (naphthalene: carrier gas: char) to form a turbulent gaseous stream having a Reynolds flow index number of at least 2000. The stream is passed through a pyrolysis zone for about one second and then passed to a cooling zone where the oil formed by the pyrolysis of the naphthalene is cooled to a temperature below 400° F. The oil has the following elemental analysis: about 94% carbon, about 6% hydrogen and about 0% oxygen.

EXAMPLE 12

The method of Example 11 is repeated employing a naphthalene: carrier gas: char ratio of 1:2:5 and a residence time of less than about 4 seconds to obtain an oil very similar to the oil recovered in Example 11.

EXAMPLE 13

Sun dried cow manure (3% moisture) is shredded to minus one-quarter inch mesh and combined with a carrier gas containing about 1% by weight oxygen and hot char heated to a temperature of 1150° F., to form a turbulent gaseous stream (Reynolds flow index number 3000). The weight ratio of particulate manure to gas to char is 1:1:4. The turbulent gaseous stream is passed through a pyrolysis zone over a residence time of about 0.8 seconds to form organic liquid values which are rapidly cooled in a cooling zone after leaving the pyrolysis zone to a termperature below 450° F.

EXAMPLE 14

Oven dried municipal waste (1% moisture) containing less than 5% metal, glass and other inorganic matter is shredded to minus one-eighth mesh and purged with nitrogen to remove oxygen therefrom. The waste, containing less than 1% oxygen, is fed into pyrolysis reactor under a nitrogen atmosphere to prevent the admission of air and combined with a carrier gas substantially free of oxygen and inert to the waste and hot char (T = 1350° F) to form a turbulent gaseous stream (Reynolds flow index number of 2000+). The stream has the following weight ration of waste to gas to char: 1:2:2. The turbulent gaseous stream is passed through a pyrolysis zone to heat the shredded waste to a temperature between 800° F and about 950° F. to form organic chemical and fuel values. These values are rapidly cooled after leaving the pyrolysis zone to a temperature below 300° F. in a quench tower and recovered in a phase separation tank.

EXAMPLE 15

The process of Example 13 is repeated employing a shredded manure: gas: char ratio of 1:1:10 wherein the char is heated to a temperature of 1600° F. to heat the manure in the pyrolysis zone to a temperature of about 1000° F.

EXAMPLE 16

The following laboratory pyrolysis tests were conducted to determine the operating conditions needed to maximize oil yields. Product yields and overall material balance determinations were obtained for a variety of feed materials by direct measurement of input and output streams. Inputs to the pilot plant were simply the solid feed and the nitrogen carrier gas, while the products included char, oil, make-gas, and nitrogen carrier gas. The char and oil were collected separately and weighed. The gas yield was determined by measuring the composition of make-gas in the nitrogen stream, and calculating the total product gas using the amount of nitrogen feed as a constant quantity. From these measurements, the product yield could be expressed as a percentage of the incoming feed.

A sufficient number of tests were run on each feed material to maximize oil yields as a function of temperature. Residence times were measured, but were not a significant factor due to the rather small variation that could be achieved in the laboratory unit. Typical residence times were from 0.1 to 0.3 seconds. The system pressure was usually about two psig.

Figure 2:
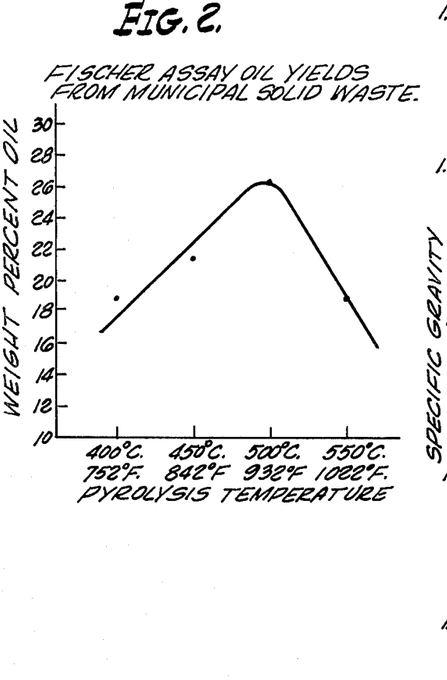
FIG. 2 is a graph showing the oil yield of the present process with respect to the pyrolysis temperature of the process.

Studies using the Fischer assay technique provided an optimal temperature within the 850 to 950° F. range for the pyrolysis of municipal waste. These results are illustrated in FIG. 2, and were used as base-line data. Experimental data from the 3 lb/hr pilot plant have been catalogued in terms of feed type and the results are summarized in Table 8. Data obtained from these liquefaction runs indicate oil yields as high as 30 to 40 wt.%. The importance of rapid pyrolysis is thus emphasized by these high yields, as compared to the baseline Fischer assay of only 20 to 30 wt.% as shown in FIG. 2.

Data derived from the 3 lb/hr pilot plant include chemical analysis of the feed, char, and oil. Three types of chemical analysis are used to characterize the materials — the ultimate analysis proximate analysis, and Fischer assay. Table 9 gives typical analytical data for several of the feedstocks tested. An important characteristic of both the oil and char from these tests is the very low sulfur content less than 0.5 wt.%.

TABLE 8
PRODUCT YIELDS AND OPERATING CONDITIONS FOR THE 3/HR PILOT PLANT

| Municipal Waste From The Black Clawson Company Run No. | Date | Wt. Percent Tar & Oil | Wt. Percent Char | Wt. Percent Gas | Total Wt. Percent Recovered | Pyrolysis Temp. °F. Exit Gas Temp. | Residence Time Sec. | System Press. PSIG | (Exit Gas Inlet Gas) Temp. °F. | N₂ Flowrate SCFM |
|---|---|---|---|---|---|---|---|---|---|---|
| 231-45 | 10-30-70 | 33 | 24 | 12 | 77.4 | 950 | .198 | 2.8 | 420 | 9 |
| 231-65 | 1-6-71 | 35 | 21 | 22 | 78 | 1000 | .206 | 3.0 | 300 | 8.9 |
| 231-195 | 4-12-71 | 50 | 18 | ** | 68.4 | 950 | .197 | 2.8 | 450 | 8.9 |
| RUBBER | | | | | | | | | | |
| 209-43 | 7-23-70 | 16.7 | 62 | ** | 79 | 1000 | .153 | 1.2 | 500 | 11 |
| 231-30 | 10-16-70 | 38 | 48 | 4 | 88 | 1000 | .123 | 3.7 | 450 | 14 |
| REDWOOD BARK | | | | | | | | | | |
| 231-120 | 5-7-71 | 44.5 | 19.8 | 10.3 | 74.6 | 950 | .289 | 2 | 400 | 6.2 |
| DOUGLAS FIR BARK | | | | | | | | | | |
| 231-75 | 1-27-71 | 51 | 16 | 17 | 84 | 930 | .214 | 2.3 | 310 | 8.8 |
| RICE HULLS | | | | | | | | | | |
| 231-90 | 3-9-71 | 31.2 | 56.5 | 20.9 | 108.6 | 950 | .214 | 1.4 | 500 | 9 |

TABLE 9
CHEMICAL ANALYSES OF SOLID WASTE FEEDS AND PYROLYSIS PRODUCTS

| | Black Clawson BC-4 231-45 | | | Black Clawson BC-3 231-60 | | | Ground Rubber 209-43 | | | Red Wood Bark 231-120 | | | Douglas Fir Bark 231-75 | | | Rice Hulls 231-90 | | |
|---|---|---|---|---|---|---|---|---|---|---|---|---|---|---|---|---|---|---|
| Ultimate Analysis | Feed | Char | Tar | Feed | Char | Tar | Feed | Char | Tar | Feed | Char | Tar | Feed | Char | Tar | Feed | Char | Tar |
| C | 44.7 | 48. | 51.5 | 44.65 | 4792 | 50.10 | 63.78 | 68.93 | 83.0 | 47.73 | 62.037 | 49.44 | 30.63 | 64.26 | 59.67 | 37.74 | 63.40 | 27.58 |
| H | | 3.9 | 6.9 | 6.29 | 3.52 | 8.15 | 6.87 | 1.20 | 9.17 | 6.81 | 3.00 | 6.57 | 5.93 | 3.99 | 5.97 | 5.32 | 2.04 | 7.86 |
| O (diff) | | 13.2 | | | | | | | 4.80 | | 19.65 | 19.73 | | 42.69 | 24.15 | 33.93 | 37.49 | 4.37 | 62.60 |
| N | .85 | 1.1 | 1.0 | 0.79 | 0.92 | 0.72 | 0.26 | 0.16 | 0.70 | 0.11 | 0.15 | 0.17 | 0.19 | 0.29 | 0.33 | 0.41 | 1.78 | 0.38 |
| S | 0.12 | 0.3 | 0.2 | 0.45 | 0.33 | 0.13 | 1.50 | 1.50 | 1.12 | 0.06 | 0.11 | 0.14 | 0.00 | 0.00 | 0.00 | 0.02 | 0.50 | 0.03 |
| Cl | 0.22 | 0.2 | 0.35 | 0.61 | 0.17 | 0.31 | | | | 0.05 | 0.07 | 0.04 | 0.01 | 0.03 | 0.01 | 0.18 | 0.11 | 0.11 |
| Proximate Analysis | | | | | | | | | | | | | | | | | | |
| Ash | 561 | 31.81 | 0.45 | 4.87 | 43.57 | 0.10 | 4.37 | 23.41 | 0.07 | 27.17 | 19.51 | | 0.80 | 7.33 | 0.09 | 18.34 | 27.8 | 1.44 |
| Moist | 2.57 | 1.44 | 6.3 | 4.0 | 0.33 | 20.7 | 0.71 | 0.65 | 1.0 | 7.00 | 2.00 | | 2.3 | 2.76 | | 4.13 | 0.0 | 62.15 |
| Vel Mat. | 80.61 | | | | 49.94 | | 65.14 | 8.66 | | 67.33 | 31.74 | | 82.37 | 38.81 | | 63.76 | 11.77 | 24.75 |
| Fischer Assay of Feed | | | | | | | | | | | | | | | | | | |
| H₂O | 25.5 | | | 22.6 | | | | | | 29.8 | | | 27.3 | | | | | |
| Tar | 26.0 | | | 11.5 | | | | | | 14.2 | | | 30.5 | 6.47 | | | | |
| Lt. Oil | 0.6 | | | 1.0 | | | | | | 1.1 | | | 0.0 | | | | | |
| Coke | 330 | | | 44.6 | | | | | | 40.0 | | | 33.2 | | | | | |
| Gas | 14.9 | | | 20.3 | | | | | | 19.9 | | | 8.4 | | | | | |

Energy balance considerations have been treated indirectly by analyzing the solids with modern techniques such as differential thermal analysis and thermal gravimetric analysis. These indirect procedures were necessary because of excessive and incalculable heat losses associated with the electrically heated reactor. It has been postulated that cellulose decomposes by endothermic reaction when conducted at liquefaction conditions to yield high percentages of levoglucosan. When further decomposition occurs at higher temperatures, levoglucosan breaks down exothermally as illustrated in the following equation:

cellulose $\xrightarrow{endothermic}$ Levoglucosan $\xrightarrow{exothermic}$ $H_2O$, $CO$, $CO_2$, etc.

Initial estimates suggested that the pyrolysis of solid waste, which is principally cellulose, was strongly exothermic; however, our subsequent tests indicate that the reaction is thermally neutral, i.e., neither endo or exothermic.

EXAMPLE 17

A plant having a schematic substantially similar to FIG. 1 and having a capacity of 8000 pounds of dried solid waste per day is fed dried (from about 3 to about 5% moisture) solid waste which is substantially free of glass, ceramic and metals. The solid waste has a nominal particle size of −28 mesh with all solid waste passing a −¼ inch mesh. The solid waste is entrained with product gas having a temperature of about 200° F. The product gas is free of oxygen gas. The entrained solid waste is fed simultaneously with hot char entrained in hot product gas into a pyrolysis tubular reactor under turbulent conditions. The hot char has a temperature of about 1600° F. The solid waste and char have a residence time of about 0.5 seconds in the reactor wherein the solid waste undergoes flash pyrolysis to produce product gas, volatile organic values and char. The char and other products are passed to two cyclones in series wherein a substantial portion of the char is separated from the gas and volatiles.

The hot, char-free products leaving the reactor cyclone are rapidly cooled from about 900° F. to 200° F. by a venturi quench system using recirculated product oil. In this way, the valuable liquid products are recovered before thermal cracking can occur. Trim cooling by a disc and donut unit is then used to adjust the temperature of the outlet gas which is further cooled to about 110° F. in a packed bed scrubber before being returned to the process via a recycle compressor for entraining solid waste and hot char. Condensed water from the decomposition of cellulosic compounds amounts to about 13% of the pyrolysis feed. This water is cooled in a separate heat exchanger, and a portion is then returned to a scrubber for cooling purposes and the remainder discarded. Alternatively, since the process generates a considerable quantity of excess heat, this water may be returned to a process heater for vaporization and oxidation of the associated hydrocarbon impurities.

Experience has shown that moisture-free pyrolytic oil is rather viscous due to the presence of 7 to 10% by weight of high boiling point tars which behave essentially as solids at ambient conditions. Temperatures at the quench tower are therefore adjusted so that the make-oil contains about 10% water which ensures a viscosity suitable for further handling. Alternatively the tars can be removed by filtration or centrifugation. The oil is then sent to storage, preferably in the absence of oxygen.

The char is collected from the cyclones and a portion of it is entrained in hot product gas and transported on a char heater wherein the char is partially combusted with air or oxygen to heat the char to a temperature of about 1600° F. The hot char, entrained in product gas, is then transported to a hot char storage vessel and subsequently to the reactor. The remaining char is treated as described in the detailed description.

EXAMPLE 18

An oil product was prepared from municipal waste (Palo Alto, California) employing a residence time of approximately 1 second and a pyrolysis temperature of about 900° F. to yield an oil product having the following characteristics.

| Report Basis | As Rec'd. |
|---|---|
| Moisture, Total | 14.1 |
| Volatile Matter | 74.3 |
| Fixed Carbon | 9.5 |
| Ash | 2.1 |
| Total | 100.0 |
| HHV, Btu/lb | 8490 |
| Btu/gal. | 94,000 |
| Moisture | 14.1 |
| Hydrogen | 4.9 |
| Carbon | 48.7 |
| Sulfur | 0.3 |
| Nitrogen | 1.3 |
| Oxygen | 28.1 |
| Chlorine | 0.5 |
| Ash | 2.1 |
| Total | 100.0 |
| Ash Fusibility (°F.) | |
| (red. Atm) I.T. | 1930 |
| S.T. | 2230 |
| F.T. | 2660 |
| Specific Gravity 25/25 | 1.33 |
| Distillation: | |
| I.B.P. | 105° C. |
| 280° C. | 17.4% |
| Residue | 82.6 |
| Total | 100.0 |
| Note: Sample Frothed at 290° C., Stopping Distillation | |
| Flash Point | 133° F. |
| Fire Point | Not Obtained |
| Pour Point | 77° F. |
| Saybolt Viscosity | |
| (14% Moist. Garboil) | |
| 170° F. | 3100 SSU |
| 180 | 1700 SSU |
| 190 | 1100 SSU |
| 200 | 670 SSU |
| 210 | 450 SSU |
| 315 | 350 SSU |

The liquid product is divided into three samples. The first sample was 100% of the liquid product; the second sample was a blend of 25% of the liquid product and 75% of No. 6 fuel oil from San Diego Gas and electric Co. and the third sample was a 50—50 blend of the liquid product and a No. 6 fuel oil from the San Diego Gas and Electric Co. Analytical data for each of these samples are shown in the following table:

| Sample Indent. | San Diego G & E No. 6 Fuel Oil | Garboil, 25% San Diego #6, 75% | Garboil, 50% San Diego #6, 50% |
|---|---|---|---|
| HHV, Btu/lb | 18,290 | 16,670 | 14,350 |
| Moisture | 0.3 | 3.9 | 5.5 |
| Hydrogen | 11.0 | 9.9 | 8.7 |
| Carbon | 86.0 | 75.6 | 68.2 |
| Sulfur | 0.4 | 0.3 | 0.3 |
| Nitrogen | 0.4 | 0.7 | 0.9 |
| Oxygen | 1.82 | 8.7 | 15.1 |
| Ash | 0.08 | 0.9 | 1.3 |
| Total | 100.00 | 100.0 | 100.0 |
| Saybelt Viscosity | | | |
| 122° F. – 53.6 SSF | 126° F – 121 SSF | 154° F. – No Flow |
| 150° F. – 240 SSU | 180° F. – 52 SSF | 184° F. – 107 SSF |
| 178° F. – 145 SSU | 200° F. – 37 SSF | 200° F. – 81 SSF |

The comparative viscosity with respect to temperature are shown for a typical No. 6 fuel oil and liquid product in the following table:

Viscosity - Comparative viscosities are shown below:

| Temperature (°F.) | Typical No. 6 | Liquid Product (at 14% H$_2$O) |
|---|---|---|
| 170 | 300 SSU | 3100 SSU |
| 180 | 220 | 1700 |
| 190 | 170 | 1100 |
| 200 | 130 | 670 |
| 210 | 110 | 450 |

The maximum viscosity desired for pumping oil into a utility boiler is approximately 3000 SSU and a maximum viscosity for atomization is on the order of about 150 SSU. For the above liquid product having a moisture content of 14%, a pumping temperature of about 170° F. would be used and an atomization temperature of 230° F. was used.

We have found that the viscosity of the liquid product is both dependent upon its moisture content and its temperature. The viscosity of the oil decreases with increasing moisture content or increasing temperature. However, we have found that the oil is repeatedly heated and cooled or allowed to age in the presence of oxygen, the viscosity of the oil increases to form a tar-like substance which will decompose before its pore point temperature is reached.

The density of the liquid product is also a variable and is also a function of both temperature and moisture content. Density decreases with increasing temperature. The specific gravity of the liquid product at 110° F. is about 1.36 while at 190° F., it is about 1.05. At temperatures above 190° F. the specific gravity will decrease only slightly. With the increasing moisture content, the specific gravity garboil decreases as would be expected because of the dilution factor. At a temperature about 80° F., the specific gravity of the oil with a 10% moisture content is about 1.3 and decreases to about 1.2 at a moisture content of about 40%.

EXAMPLE 19

Samples of rice hulls, animal wastes and tree bark were pyrolyzed at according to the present process to yield char, oil and gas. The characteristics of the feed stock and the resulting products are shown in the following two tables:

| a | Rice Hulls | Rice Hulls | Rice Hulls | Rice Hulls | Rice Hulls | Rice Hulls |
|---|---|---|---|---|---|---|
| b | -20 | -20 | 70% -200 | 70%-200 | 70%-200 | 70%-200 |
| c | 790 | 940 | 800 | 880 | 935 | 965 |
| Feed Analysis, Wt. % | | | | | | |
| e | 38.80 | 39.12 | 38.36 | 39.24 | 39.62 | 37.33 |
| f | 5.24 | 5.36 | 5.40 | 5.53 | 5.37 | 5.34 |
| g | 19.93 | 20.39 | 17.46 | 18.10 | 19.26 | 12.85 |
| h | 35.21 | 34.31 | 38.02 | 36.29 | 35.11 | 43.74 |
| i | 0.00 | 2.20 | 3.20 | 0.44 | 0.00 | 2.97 |
| j | 63.56 | 61.36 | 62.17 | — | 63.07 | 62.34 |
| Char Yield Dry Basis | | | | | | |
| l | 53.9 | 34.6 | 48.5 | 35.7 | 26.1 | 30.3 |
| m | 6200* | 5800* | 6200* | 6100* | 6000* | 5700* |
| n | 36.55 | 35.45 | 37.68 | 36.03 | 35.43 | 33.48 |
| o | 3.74 | 2.12 | 3.21 | 2.64 | 2.22 | 2.34 |
| p | 39.70 | 52.01 | 40.86 | 49.22 | 53.68 | 53.93 |
| q | 18.93 | 9.82 | 17.63 | 11.45 | 8.29 | 9.64 |
| Oil Yield, Dry Basis | | | | | | |
| s | 18.6 | 25.4 | 29.5 | 44.1 | 50.4 | 48.3 |
| t | 11,400* | 10,300* | 9,900* | 10,400* | 10,000* | 10,000* |
| u | 67.16 | 62.66 | 59.83 | 62.44 | 64.52 | 60.13 |
| v | 5.77 | 5.61 | 5.87 | 5.81 | 4.56 | 5.93 |
| w | 25.55 | 29.98 | 32.47 | 29.39 | 29.28 | 31.96 |
| Pyrolytic Gas Yield, Dry Basis | | | | | | |
| y |  | 10.2 | 10.8 | 12.0 | 32.2 | 19.7 |
| z |  | 201 | 229 | 215 | 292 | 250 |
| aa |  | 22.86 | 19.62 | 7.29 | 40.07 | 23.10 |
| bb |  | 35.00 | 27.88 | 22.78 | 22.44 | 28.28 |
| cc |  | 40.71 | 45.44 | 60.14 | 28.85 | 40.54 |
| dd |  | 1.43 | 2.79 | 4.56 | 7.45 | 3.49 |
| ee |  |  | 1.35 | 2.77 | 0.46 | 1.72 |
| ff |  |  | 1.89 | 1.55 | 0.63 | 2.40 |
| gg | 17.5 | 31.8 | 4.8 | 11.6 | 15.1 | 5.8 |
| hh | 89.9 | 102.0 | 93.6 | 103.4 | 123.8 | 104.1 |
| ii | 107.3 | 88.7 | 114.0 | 97.7 | 74.0 | 85.1 |
| jj | 82.0 | 80.4 | 103.2 | 112.8 | 131.3 | 126.0 |
| kk | 96.7 | 111.4 | 75.7 | 91.5 | 130.1 | 91.3 |

| a | Animal Waste | Animal Waste | Animal Waste | Tree Bark | Tree Bark |
|---|---|---|---|---|---|
| b | 70%-200 | 70%-200 | 70%-200 | 70%-200 | 70%-200 |
| c | 805 | 920 | 940 | 810 | 950 |
| Feed Analysis, Wt. % | | | | | |
| e | 38.53 | 38.70 | 38.12 | 47.56 | 49.11 |
| f | 4.87 | 4.79 | 4.89 | 5.40 | 5.60 |
| g | 23.05 | 22.87 | 22.59 | 11.54 | 8.62 |
| h | 28.97 | 29.15 | 29.94 | 35.09 | 36.39 |
| i | 1.22 | 1.02 | 2.99 | 1.54 | 0.79 |
| j | 58.88 | 60.03 | 57.52 | 65.24 | 69.31 |
| Char Yield, Dry Basis | | | | | |
| l | 47.5 | 39.0 | 28.7 | 41.0 | 27.5 |
| m | 5983 | 5382 | 5449 | 8260 | 7579 |
| n | 36.29 | 33.46 | 34.54 | 49.86 | 48.15 |
| o | 2.65 | 2.18 | 2.16 | 4.02 | 2.38 |
| p | 50.28 | 51.57 | 48.82 | 21.38 | 33.74 |
| q | 4.81 | 7.55 | 7.93 | 24.34 | 15.04 |
| Oil Yield, Dry Basis | | | | | |
| s | 19.7 | 20.1 | 16.3 | 28.3 | 33.3 |
| t | 11,100 | 12,100* | 11,800* | 10,300* | 11,200* |
| u | 61.93 | 64.86 | 64.83 | 60.45 | 62.57 |
| v | 6.76 | 7.04 | 6.92 | 6.04 | 6.84 |
| w | 24.06 | 17.92 | 19.76 | 30.72 | 29.50 |
| Pyrolytic Gas Yield Dry Basis | | | | | |
| y | 10.7 | 19.2 | 14.7 | 8.0 | 14.1 |
| z | 226 | 292 | 202 | 222 | 406 |
| aa | 6.08 | 9.10 | 5.89 | 6.26 | 14.04 |
| bb | 21.87 | 18.77 | 19.64 | 14.61 | 14.46 |
| cc | 55.89 | 43.22 | 62.19 | 64.69 | 39.25 |
| dd | 6.08 | 8.53 | 5.56 | 10.43 | 15.28 |
| ee | 2.31 | 2.84 | 2.29 | 2.30 | 5.36 |
| ff | 7.77 | 17.54 | 4.43 | 1.71 | 11.61 |
| gg | 11.2 | 8.1 | 14.8 | 16.5 | 2.7 |
| hh | 89.1 | 86.3 | 74.5 | 93.8 | 77.6 |
| ii | 104.3 | 89.5 | 62.5 | 78.5 | 109.2 |
| jj | 84.2 | 85.7 | 66.3 | 84.6 | 79.6 |
| kk | 82.5 | 76.7 | 75.2 | 101.3 | 69.0 | a is Feed
b is Feed Size, Mesh
c is Reactor Exit Temperature; °F.
e is Carbon
f is Hydrogen (Total)
g is Ash
h is Oxygen (Difference)
i is moisture
j is Volatile Matter
l is % of Feed Wt. Converted
m is Gross Heating Value, BTU/lb.
n is Carbon, Wt. %
o is Hydrogen
p is Ash
q is Oxygen (Difference)
s is % of Feed Wt. Converted
t is Gross Heating Value, BTU/lb.
u is Carbon, Wt. %
v is Hydrogen
w is Oxygen (Difference)
y is % of Feed Wt. Converted
z is Gross Heating Value, BTU/SCF
aa is $H_2$, Mol %
bb is CO
cc is $CO_2$
dd is $CH_4$
ee is $C_2$-$C_4$
ff is $H_2S$
gg is Pyrolytic Water Yield, % of Feed Wt.
hh is Total Pyrolysis Products, % of Feed Wt.
ii is Ash Recovery, %
jj is Carbon Recovery, %
kk is Hydrogen Recovery, %

*Estimated from Empirical Correlation

The nitrogen content of the rice hulls was from about 0.4 to about 0.7%. The nitrogen content of the animal wastes was about 2%. The nitrogen content of the tree bark was less than 0.2%. The sulfur content of the rice hulls was less than 0.2%. The sulfur content of the animal wastes was around 0.5% and the sulfur content of the tree bark was around 0.4%. The chlorine content of the rice hulls was about 0.2%, the chlorine content of the animal wastes was about 1.7%, and the chlorine content of the tree bark was about 0.2%. The char from the rice hulls had a nitrogen content of from about 0.2 to about 0.7% a sulfur content of about 0.2% and a chlorine content of about 0.2%. The nitrogen content of the char from the animal waste was about 2%, a sulfur content of less than 1% and a chlorine content of less than 4%. The char prepared from the tree bark contained less than 0.25% nitrogen, less than 0.1% sulfur and less than 0.4% chlorine. The oil from the rice hulls contained from about 0.9 to about 1.4% nitrogen, less than 0.1% sulfur; and from about 0.1 to about 0.3% chlorine. The nitrogen content of the oil from the animal waste was about 6% plus or minus 1; the sulfur content was about 25%, and the chlorine content was from about 0.2 to about 0.4%. The oil from the tree bark contained less than 1% nitrogen, less than 0.1% sulfur, and less than 0.2% chlorine.

What is claimed is:

1. A process for recovering chemical values from municipal solid waste materials containing organic solids comprising the steps of:
   a. Forming a turbulent gaseous steam in a mixing zone consisting essentially of carrier gas, particulate municipal solid waste materials having a maximum particle dimension of less than one inch, and particulate hot char wherein the carrier gas is present in an amount of from about 0.2 to about 2 pounds per pound of municipal waste material, such that the municipal solid waste material and hot char are intimately admixed and entrained within the gaseous portion of the stream, said carrier gas being substantially free of elemental oxygen;
   b. Passing said gaseous stream including said municipal solid waste material and hot char through a pyrolysis zone under turbulent flow conditions and heating the municipal solid waste material in said stream to a temperature ranging between about 600° F. and 2000° F. in a pyrolysis zone to form chemical values, the residence time of said municipal solid waste materials in said mixing and pyrolysis zones being less than one minute, the hot char supplying a portion of the necessary heat to heat the waste material in said pyrolysis zone; and
   c. Removing the heated gaseous stream from the pyrolysis zone.

2. The process of claim 1 wherein heated char is utilized to provide a substantial portion of the heat required to heat the municipal solid waste material in the pyrolysis zone.

3. The process of claim 2 wherein the residence time of the municipal solid waste materials solids in the pyrolysis zone ranges between about 0.05 and about 10 seconds.

4. The process of claim 2 wherein the residence of said municipal solid waste materials in the pyrolysis zone is about 0.5 second.

5. The process of claim 2 wherein said municipal solid waste material is heated to a temperature ranging between from about 600° F to about 1050° F in said pyrolysis zone.

6. The process of claim 2 wherein said municipal solid waste material is heated from about 850° to 950° F. in said pyrolysis zone.

7. The process of claim 2 wherein a portion of the solids recovered from the pyrolysis zone is heated to a temperature ranging from between about 1150° F to about 1800° F and thereafter is utilized to form the heated char portion of the high velocity stream.

8. The process of claim 7 wherein sufficient amounts of the heated char is utilized to provide substantially all of the heat required to heat the municipal solid waste materials solids in the pyrolysis zone.

9. The process of claim 8 wherein the heated char portion of the gaseous stream has a temperature of 1600° F.

10. The process of claim 7 wherein the carrier gas is a hydrogen enriched gas stream.

11. The process of claim 2 wherein a portion of the segregated pyrolyzed organic solids is heated in a degasification zone in the presence of a carrier gas to a temperature ranging from between about 1200° F. to about 1800° F. to form a hydrogen rich gas stream, said carrier gas being nonoxidizing to said organic solids.

12. The process of claim 11 wherein the hydrogen rich gas stream is utilized in the carrier gas in the gaseous stream.

13. The process of claim 11 wherein the degasified char is heated to an elevated temperature below the ash softening point of the char in the presence of a carrier gas to further remove impurities, said carrier gas being non-reactive to said char.

14. The process of claim 2 wherein said waste material is a waste material selected from the group comprising municipal waste material, manure, sewage sludge, automotive tires, food processing wastes, agricultural wastes, industrial wastes and mixtures thereof.

15. The process of claim 2 wherein said municipal solid waste material is substantially dried prior to being pyrolyzed.

16. The process of claim 2 wherein the volatilized product is separated into its component parts.

17. The process of claim 1 wherein the heat required for pyrolysis of the municipal waste material is supplied by utilizing heated carrier gas in the formation of the gaseous stream.

18. The process of claim 1 wherein indirect heating means are utilized to heat the waste municipal solids in the gaseous stream flowing through the pyrolysis zone.

19. The process of claim 2 wherein said municipal solids waste material is automotive tires.

20. The process of claim 19 wherein the waste municipal solids are heated to a temperature ranging between 800° F. to about 1700° F. in the pyrolysis zone.

21. A process for the production and recovery of chemical and fuel values from municipal solid waste materials containing organic solids comprising the steps of:
   a. Combining a carrier gas, particulate municipal solid waste material in which the carrier gas is present in an amount of from about 0.2 to about 2 pounds per pound of municipal solid waste material, and hot particulate char to form a turbulent gaseous stream, said carrier gas being substantially free of elemental oxygen;
   b. Passing said turbulent gaseous stream including the municipal solid waste material and char into a pyrolysis zone for a predetermined period of time so that said municipal solid waste material is heated to a temperature of from about 600° F. to about 2000° F. to form organic chemical and fuel values, said particulate char being heated to a predetermined temperature so that said char heats said municipal solid waste material in said stream to a temperature of from about 600° F. to about 2000° F.,
   c. Removing said organic chemical and fuel values from said pyrolysis chamber; and
   d. Rapidly cooling said organic chemical and fuel values to a temperature below the pyrolysis temperature so that degradation of said organic chemical and fuel values is minimized.

22. The process according to claim 21 where including the step of separating the particulate char from the organic chemical and fuel values.

23. The process of claim 2 wherein the organic solids are substantially segregated from the inorganic municipal solid wastes prior to pyrolyzing the solids.

24. The process of claim 2 wherein the organic char recovered from said pyrolysis zone is segregated from the inorganic waste solids which have passed through the pyrolysis zone.

25. The process according to claim 21 where the predetermined residence time in the pyrolysis chamber ranges from about 0.05 to about 10 seconds.

26. The process according to claim 21 wherein said municipal solid waste material is heated to a temperature from about 600° F. to about 1050° F. in pyrolysis chamber.

27. The process according to claim 21 wherein said municipal solid waste material is heated to a temperature from about 800° F. to about 950° F. in said pyrolysis chamber.

28. The process according to claim 27 wherein said predetermined residence time of said municipal solid waste materials in the pyrolysis zone is about one second or less.

29. The process according to claim 21 wherein said municipal solid waste material is substantially free of inorganic matter prior to the heating step in the pyrolysis chamber.

30. The process according to claim 21 wherein the municipal solid waste material has a maximum particulate dimension of less than one inch.

31. The process according to claim 21 including the steps of separating the particulate char from the organic chemical and fuel values after said organic values are cooled;

Heating a portion of said segregated particulate char to a temperature ranging from about 1150° F. to about 1800° F.; and Recycling said hot char to form said turbulant gas stream.

32. A process according to claim 21 whereas a sufficient amount of carrier gas is combined with said particulate municipal solid waste materials and particulate char to provide a turbulant gas stream having a Reynolds Index Number of at least 2000.

33. The process according to claim 21 wherein about 0.2 to about 2 pounds of carrier gas is utilized for each pound of particulate municipal solid waste materials to form said turbulant gas stream.

34. The process according to claim 33 wherein a sufficient amount of particulate municipal solid char is employed so that said particulate waste material is heated to a temperature from about 600° F. to about 1500° F. said pyrolysis zone.

35. The process according to claim 34 wherein at least two pounds of particulate municipal solid char is employed for each pound of particulate waste material in said turbulant.

36. The process according to claim 21 wherein carrier gas is a hydrogen enriched gas stream.

37. A process according to claim 21 wherein said solid waste material has the moisture content of less than 5% water.

38. A process for recovering chemical values from waste materials containing organic solids comprising the steps of:
a. Forming a turbulent gaseous stream in a mixing zone consisting essentially of carrier gas, particulate waste materials including materials selected from the group consisting of municipal wastes, sewage sludge, plastics, cellulosic materials, manure, agricultural wastes, animal processing wastes, rubber, crude oil processing wastes, and mixtures thereof, having a maximum particle dimension of less than one inch, and particulate hot char wherein the carrier gas is present in an amount of from about 0.2 to about 2 pounds per pound of waste material, such that the waste material and hot char are intimately admixed and entrained within the gaseous portion of the stream, said carrier gas being substantially free of elemental oxygen;
b. Passing said gaseous stream including said waste material and hot char through a pyrolysis zone under turbulent flow conditions and heating the waste material in said stream to a temperature ranging between about 600° F. and 2000° F. in a pyrolysis zone to form chemical values, the residence time of said waste materials in said mixing and pyrolysis zones being less than one minute, the hot char supplying a portion of the necessary heat to heat the waste material in said pyrolysis zone; and
c. Removing the heated gaseous stream from the pyrolysis zone.

39. A process for the production and recovery of chemical and fuel values from waste materials containing organic solids comprising the steps of:
a. Combining a carrier gas, particulate waste materials including materials selected from the group consisting of municipal wastes, sewage sludge, plastics, cellulosic materials, manure, agricultural wastes, food processing wastes, crop residue, cannery wastes, animal processing wastes, rubber, crude oil processing wastes, and mixtures thereof, in which the carrier gas is present in an amount of from about 0.2 to about 2 pounds per pound of waste material, and hot particulate char to form a turbulent gaseous stream substantially free of elemental oxygen;
b. Passing said turbulent gaseous stream including the waste material and char into a pyrolysis zone for a predetermined period of time so that said waste material is heated to a temperature of from about 600° F. to about 2000° F. to form organic chemical and fuel values, said particulate char being heated to a predetermined temperature so that said char heats waste material in said stream to a temperature of from about 600° F. to about 200° F.;
c. Removing said organic chemical and fuel values from said pyrolysis chamber; and
d. Rapidly cooling said organic chemical and fuel values to a temperature below the pyrolysis temperature so that degradation of said organic chemical and fuel values is minimized.

40. A process as claimed in claim 21 in which the carrier gas, and particulate waste materials are combined in the pyrolysis zone to form the turbulent gaseous stream.

* * * * *